(12) United States Patent
Riegel

(10) Patent No.: US 6,373,561 B2
(45) Date of Patent: Apr. 16, 2002

(54) DEVICE AND METHOD FOR DETECTING DEPTH AND COLOR INFORMATION OF AN OBJECT TO BE SURVEYED

(75) Inventor: Thomas Riegel, Hohenbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/798,243

(22) Filed: Mar. 5, 2001

Related U.S. Application Data

(63) Continuation of application No. PCT/DE99/02767, filed on Sep. 1, 1999.

(30) Foreign Application Priority Data

Sep. 4, 1998 (DE) .......................................... 198 40 438

(51) Int. Cl.$^7$ ............................................. G01N 21/00
(52) U.S. Cl. ....................................................... 356/73
(58) Field of Search .......................... 356/73, 2, 3, 484, 356/623, 602, 603, 604, 606, 402, 425; 250/200, 559.01, 559.07

(56) References Cited

U.S. PATENT DOCUMENTS

| 4,653,014 A | * | 3/1987 | Mikami et al. ............. 364/526 |
| 4,878,756 A | * | 11/1989 | Stauffer ...................... 356/406 |
| 5,449,911 A | | 9/1995 | Crezee ...................... 250/341.7 |

FOREIGN PATENT DOCUMENTS

| DE | 43 21 613 A1 | 1/1995 |
| DE | 43 25 542 A1 | 2/1995 |

OTHER PUBLICATIONS

International Publication No. WO 97/35439 (Migdal et al.), dated Sep. 25, 1997.
Patent Abstracts of Japan No. 10-090067 (Katsutoshi), dated Oct. 4, 1998.
"Image Processing and Optical Measuring Systems" (B. Breuckmann), Franzis Publishing Company, 1993, ISPN 3-7723-486-0, pp. 129-138.
"EHD RGB Color CCD Camera TK—1270E", Product Information, Sep. 1997, http://www.ehd.de/tk-1270.htm.

* cited by examiner

Primary Examiner—Frank G. Font
Assistant Examiner—Michael P. Stafira
(74) Attorney, Agent, or Firm—Herbert L. Lerner; Laurence A. Greenberg; Werner H. Stemer

(57) ABSTRACT

A device and a method are provided for detecting depth and color information of an object to be surveyed. A projection unit projects a predetermined wave pattern having first waves with at least one first wavelength in a spectral range outside visible light. A collector unit receives waves which have been at least partially reflected from the object and which include the first waves, that are processed by a first subunit of the collector unit, and second waves that are processed by a second subunit of the collector unit. The second waves have at least one second wavelength in the visible-light spectral range. The depth and color information of the object is detected on the basis of the waves.

18 Claims, 2 Drawing Sheets

DEVICE AND METHOD FOR DETECTING DEPTH AND COLOR INFORMATION OF AN OBJECT TO BE SURVEYED

CROSS-REFERENCE TO RELATED APPLICATION

This application is a continuation of copending International Application No. PCT/DE99/02767, filed Sep. 1, 1999, which designated the United States.

BACKGROUND OF THE INVENTION

Field of the Invention

The invention relates to a device and a method for detecting depth and color information of an object.

Such a device and such a method are extremely important in the field of quality assurance during a process for producing an object, since the depth information can be used to detect whether or not the object has a shape defect. An optical 3D measurement method is customarily used to detect the depth information.

Laser triangulation is disclosed as a 3D measurement method by a book entitled: Bildverarbeitung und optische Meßtechnik [Image Processing and Optical Measurement Techniques] by B. Breuckmann, Franzis Verlag, 1993, ISBN 3-7723-4861-0, pp. 127–128. A laser is used to project a light point onto an object to be measured. A light beam reflected from the object to be measured is received by a photosensitive detector. The position of the object which is point marked by the light beam is calculated by triangulation from the geometry of the measurement setup and an angle between the projection direction of the laser and the direction of the light beam reflected from the object. The term "projection direction of the laser" is intended to mean an axis along which the laser is aligned and along which the laser beam is projected.

The object can be measured two-dimensionally by scanning the laser beam, i.e. guiding the laser beam line-by-line over the surface of an object. In general, an elaborate opto-mechanical system is needed for scanning the laser beam.

Another disadvantage of laser triangulation is the measurement time needed for measuring an object. In the case of measuring a moving object, the measurement speed that can be achieved in the scope of laser triangulation is insufficient to measure the object fully.

Furthermore, laser triangulation is unsuitable for measuring a person, since a laser beam striking one of the person's eyes can cause damage to the eye.

An improvement of the measurement method for detecting depth information of an object, with respect to the disadvantages mentioned above, is obtained by changing from a point projection method to an extended projection method. That approach is the basis for a topometric measurement method using structured light, as is disclosed by the book entitled: Bildverarbeitung und optische Meßtechnik [Image Processing and Optical Measurement Techniques] by B. Breuckmann, Franzis Verlag, 1993, ISBN 3-7723-4861-0, pp. 129–138.

In a topometric measurement method using structured light, a predeterminable pattern (structure) is projected onto an object to be measured through the use of a projector and through the use of a transparent support which carries the pattern and is fitted in front of or behind the lens of the projector. The object pattern which becomes visible on the object to be measured is captured by a video camera. The position of the associated object point can be determined quantitatively for each pixel in the video-camera picture according to the laws of triangulation with the aid of the recorded picture and the pattern which is visible thereon.

In the case of a stripe projection method according to product information sheets for the Line Projector Type LCD-320, AWB GmbH, Gutenbergstraße 9, D-72636 Frickenhausen [Germany], February 1998, a periodic grid is projected onto an object. A stripe pattern which becomes visible on the object is captured by a camera, which is disposed at a predetermined angle with respect to the projection direction. In that case, the projected periodic grid is selected in such a way that the geometry of the stripes which become visible can be identified by using the camera. The position of the associated object point can be determined quantitatively for each pixel in the camera picture according to the laws of triangulation with the aid of the recorded stripe picture.

The methodology for positional determination of an object in the scope of the stripe projection method will be summarized below with the aid of FIG. 2. The stripe projection method also has disadvantages.

Since the stripe projection method requires the projection of a visible stripe pattern onto an object, further optical analysis which may possibly need to be carried out at the same time as the detection of the depth information of the object, for example analysis with respect to the color of the object, is no longer possible.

A color Charge-Coupled-Device camera (color CCD camera) is generally used to detect color information of an object. A digital red-green-blue color CCD camera (RGB color CCD camera) is disclosed by product information sheets entitled: EHD RGB Color CCD Camera TK-1270E, http://www.ehd.de/tk-1270.htm, September 1997.

That digital RGB color CCD camera delivers digital camera pictures with a resolution of 752×582 effective pixels. Color information is assigned to each pixel for storing or further processing a digital picture in the scope of image processing. It is determined from the RGB intensity composition of a color hue at a surveyed object point. The term "RGB intensity composition" is intended to mean an intensity which corresponds to superposition of a first spectral color red, a second spectral color green and a third spectral color blue with their respective intensities resulting in a specific color hue.

Expressed more clearly, any color hue can be produced by superposition of the first spectral color red, the second spectral color green and the third spectral color blue with known respective intensities.

The camera has three acquisition channels, each having a CCD chip which is used to determine the corresponding intensity of the first spectral color red, the second spectral color green and the third spectral color blue of a color hue of a light beam which is reflected from an object point and then strikes the camera.

Furthermore, product information sheets entitled: Richter Enterprises Solution for Optics & Imaging, Optical Prism Assembly Data Sheet, November 1994, disclose a modification of a color CCD camera. That camera has an additional acquisition channel with a CCD chip which registers the intensity of an infrared beam striking a pixel of the camera.

It is possible to determine color information of a surveyed object by using the color CCD cameras presented above.

In order to carry out comprehensive quality assurance of a production process, it would be desirable to have a measurement system with which it is easy to determine depth and color information of an object.

SUMMARY OF THE INVENTION

It is accordingly an object of the invention to provide a device and a method for detecting depth and color information of an object to be surveyed, which overcome the hereinafore-mentioned disadvantages of the heretofore-known devices and methods of this general type and which provide a simple way of detecting depth information and color information of an object to be surveyed.

With the foregoing and other objects in view there is provided, in accordance with the invention, a device for detecting depth and color information of an object to be surveyed, comprising a projection unit which is constructed in such a way that a predetermined radiation pattern (wave pattern) having first waves with at least one first wavelength in a spectral range outside the light visible to a human, can be projected. A collector unit includes at least one first and one second subunit. The first subunit is constructed in such a way that the first waves can be processed, and the second subunit is constructed in such a way that second waves, which have at least one second wavelength in the spectral range of the light visible to a human, can be processed. An evaluation unit, which is coupled to the collector unit, is constructed in such a way that the depth and color information of the object, from which the first waves and/or the second waves are at least partially reflected, can be detected from signals received by the collector unit.

With the objects of the invention in view, there is also provided a method for detecting depth and color information of an object to be surveyed, which comprises projecting a predetermined wave pattern having first waves with at least one first wavelength in a spectral range outside visible light. Waves which have been at least partially reflected from the object and which include the first waves and second waves are received. The second waves have at least one second wavelength in the visible-light spectral range. The depth and color information of the object are detected on the basis of the waves.

A special advantage of the invention is that depth information and color information of an object can, if desired, be detected at the same time through the use of a single measurement system. This is achieved in such a way that the depth information is determined, for example through the use of a topometric method employing structured light, by using first waves having first wavelengths which are outside the visible-light spectrum and do not therefore affect the surface color of the object. The collector unit furthermore has two subunits with which the first waves, having first wavelengths that lie in the spectral range outside visible light, are processed separately from the second waves, having wavelengths which lie in the visible-light spectral range. The detection of the color information of the object is therefore not perturbed and it can, if desired, be carried out at the same time as the detection of the depth information of the object.

An advantage of the device furthermore is that, due to the speed of the method, the object to be surveyed may be a moving object or even a person, because of the safety of the waves.

In accordance with another feature of the invention, the second subunit is constructed in such a way that the second waves, which have one second wavelength in the red-light spectral range, one second wavelength in the green-light spectral range and one second wavelength in the blue-light spectral range, can be processed. It is possible to utilize a standard RGB color CCD camera for this configuration of the invention.

In accordance with a further feature of the invention, the projection unit is constructed in such a way that infrared radiation can be projected. The first wavelengths lie in the infrared-radiation spectral range. Correspondingly, the first subunit is constructed in such a way that wavelengths which lie in the infrared-radiation spectral range can be processed.

In accordance with an added feature of the invention, the wave pattern is a stripe pattern. The underlying principles of a standard stripe projection method can therefore be applied.

In accordance with an additional feature of the invention, the evaluation unit is constructed in such a way that a picture can be determined from the signals received by the collector unit, and at least one value for the depth information and at least one value for the color information are assigned to at least some of the pixels in the picture. It is therefore possible to detect depth and color information of an object at the same time and in correspondence with the pixels.

In accordance with a concomitant feature of the invention, a plurality of collector units are provided, each of which is coupled to the evaluation unit. The evaluation unit is correspondingly constructed in such a way that the corresponding picture can in each case be determined from the signals received by the collector units. It is therefore possible to ensure that, even in the case of a complex object, all of the waves reflected from the object are received.

Other features which are considered as characteristic for the invention are set forth in the appended claims.

Although the invention is illustrated and described herein as embodied in a device and a method for detecting depth and color information of an object to be surveyed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
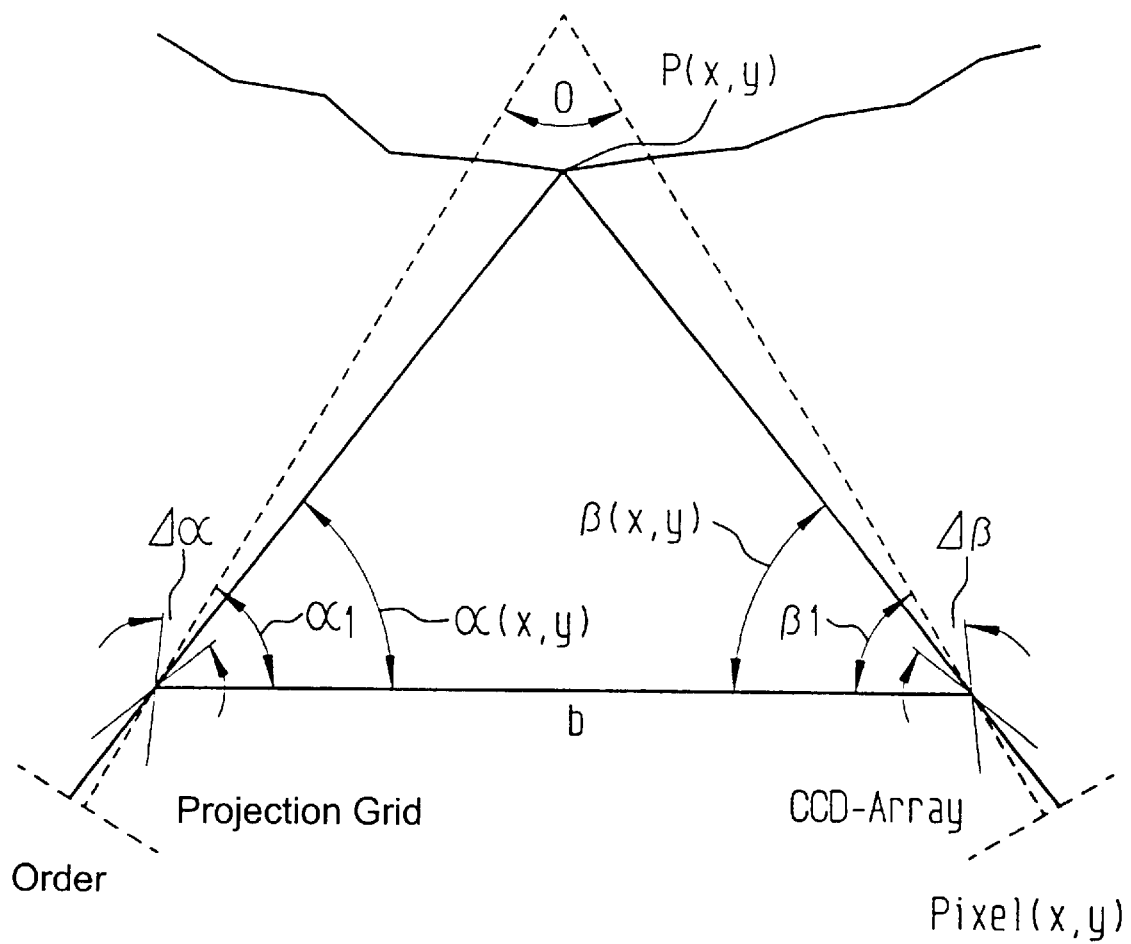
FIG. 2 is a diagram showing geometrical relationships for a stripe projection method.

Referring now to the figures of the drawings in detail and first, particularly, to FIG. 2 thereof, there is seen an illustration of a methodology for positional determination of an object in the scope of a stripe projection method.

Geometrical parameters of an optical setup represented in FIG. 2, are known. Those parameters are baseline length b, divergence $\Delta$ of an imaging characteristic of projection optics, divergence $\Delta\beta$ of an imaging characteristic of observation optics, illumination angle and observation angle $\beta$.

The associated observation angle $\beta$ is calculated for any object point P. It is determined from a central observation angle $\beta_0$ of the camera, the divergence $\Delta\beta$ of the imaging characteristic of the observation optics and a pixel coordinate X corresponding to the object point P in the camera picture. The projection angle is correspondingly calculated. It depends on the central illumination angle $_0$, the divergence $\Delta$ of the imaging characteristic of the projection optics and an order $_n$ of a grid line projected onto the object point P. The baseline length b and the angles and uniquely determine a space coordinate P(x, y) of the object point P.

Figure 1:
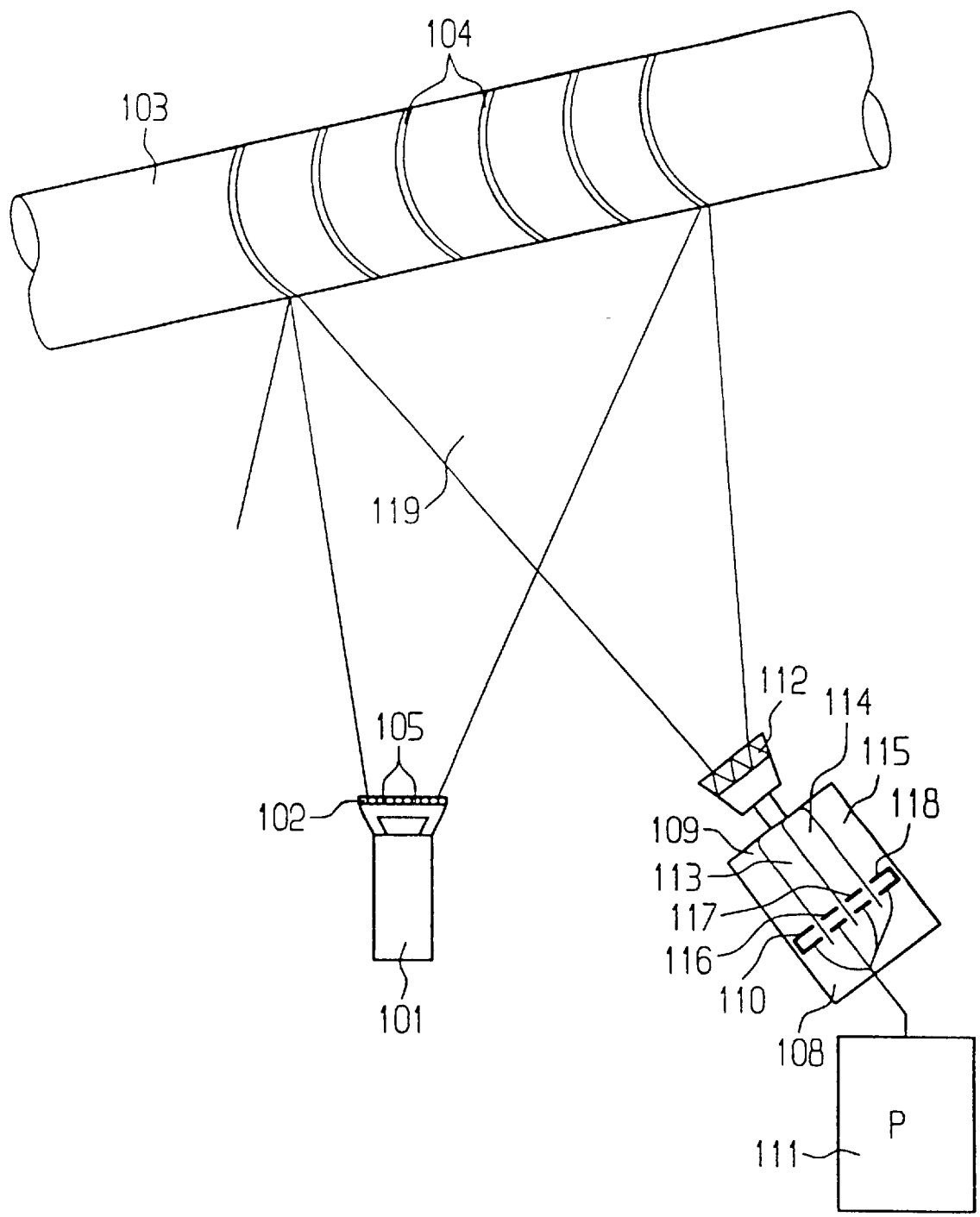
FIG. 1 is a fragmentary, diagrammatic, elevational view showing a structure of a device for detecting depth and color information of an object, according to an embodiment of the invention.

FIG. 1 shows a structure of a device for detecting depth and color information of an object to be surveyed.

The exemplary embodiment which is represented involves a combination of a stripe projection method, using a modified RGB color CCD camera in the infrared spectral range, with computerized color detection using the RGB color CCD camera.

1. Stripe projection method, using a modified RGB color CCD camera in the infrared spectral range:

An infrared projector 101 projects infrared radiation 119 in a spectral range of about 750–900 nm and, through the use of emitted radiation (waves), projects a periodic grid 102 onto an object 103 to be surveyed. The periodic grid 102 is fitted spatially in front of the infrared projector 101 in the direction of the projected radiation. An infrared stripe pattern 104, which is invisible to humans, is thereby produced on the object 103. Grid lines 105 of the periodic grid 102 are established in such a way that the geometry of the stripes 104 produced on the object 103 can be captured by a modified RGB color CCD camera 108. The modified RGB color CCD camera 108 is disclosed by product information sheets entitled: Richter Enterprises Solution for Optics & Imaging, Optical Prism Assembly Data Sheet, November 1994.

The projected infrared radiation 119 is at least partially reflected from the object 103 and therefore partially strikes the RGB color CCD camera 108.

The infrared radiation 119 which is reflected and strikes the RGB color CCD camera 108 is separated from radiation (waves) having wavelengths that lie outside the infrared spectral range, by using a configuration of a plurality of prisms 112 which are integrated in the RGB color CCD camera 108. The infrared radiation 119 directionally strikes a CCD chip 110 of a separate channel 109 of the RGB color CCD camera 108.

The infrared radiation 119 is processed by using the CCD chip 110. The CCD chip 110 generates corresponding signals that are sent to a processor 111 which is coupled to the RGB color CCD camera 108, on the basis of an infrared picture which is captured.

The processor 111 evaluates the infrared picture by determining a spatial position of an associated object point in a known reference coordinate system according to the laws of triangulation. That occurs on the basis of the signals for each pixel in the infrared picture while taking the geometry of the known grid lines of the periodic grid 102 into account. The book entitled: Bildverarbeitung und optische Meβtechnik [Image Processing and Optical Measurement Techniques] by B. Breuckmann, Franzis Verlag, 1993, ISBN [sic] 3-7723-4861-0, pp. 127–138 discloses such a process.

2. Color detection using a modified RGB color CCD camera:

Furthermore, waves which have wavelengths in the visible-light spectral range are at least partially reflected from the object 103 and therefore partially strike the RGB color CCD camera 108. The reflected light waves are resolved into wave groups in the three spectral ranges of the spectral colors red, green and blue, by using a configuration of a plurality of the prisms 112 which are integrated in the RGB color CCD camera 108. In this case, the spectral range of the first spectral color red has wavelengths of about 600–750 nm, the spectral range of the second spectral color green has wavelengths of about 500–600 nm and the spectral range of the third spectral color blue has wavelengths of about 400–500 nm. A "red picture", a "green picture" and a "blue picture" of the object 103 are thereby produced in accordance with the spectral ranges.

The three pictures are processed in three separate channels 113, 114, 115 of the RGB color CCD camera, in each case through the use of one respective CCD chip 116, 117, 118. The CCD chips 116, 117, 118 that are respectively allocated to one of the three channels 113, 114, 115 operate on the basis of the picture to generate corresponding signals that are sent to the processor 111 which is coupled to the RGB color CCD camera 108.

The processor 111 in each case operates on the basis of the signals to determine a digital color value for the spectral colors red, green and blue for at least some of the pixels in the three pictures.

According to items 1 and 2 above, the following are provided for each pixel of the surveyed object:

a) depth information for the corresponding object point, expressed by the spatial position of the object point; and b) color information of the corresponding object point, expressed by three digital color values for the three spectral colors.

I claim:

1. A device for detecting depth and color information of an object to be surveyed, comprising:
   a) a projection unit for projecting a predetermined wave pattern having first waves with at least one first wavelength in a spectral range outside visible light;
   b) a collector unit, said collector unit having at least one first subunit for processing the first waves, and said collector unit having at least one second subunit for processing second waves with at least one second wavelength in the visible-light spectral range; and
   c) an evaluation unit coupled to said collector unit for detecting depth and color information of an object from signals received by said collector unit, the object at least partially reflecting at least one of the first and second waves.

2. The device according to claim 1, wherein the first waves have a plurality of first wavelengths.

3. The device according to claim 1, wherein the second waves have a plurality of second wavelengths.

4. The device according to claim 3, wherein said second subunit processes the second waves having one second wavelength in the red-light spectral range, one second wavelength in the green-light spectral range and one second wavelength in the blue-light spectral range.

5. The device according to claim 1, wherein said first subunit processes the first waves having one first wavelength in the infrared-radiation spectral range.

6. The device according to claim 1, wherein said second subunit is an RGB color CCD camera.

7. The device according to claim 1, wherein said projection unit projects the first waves having one first wavelength in the infrared-radiation spectral range.

8. The device according to claim 1, wherein the wave pattern is a stripe pattern.

9. The device according to claim 1, wherein said evaluation unit determines a picture from the signals received by said collector unit, and at least one value for the depth information and at least one value for the color information is assigned to at least some pixels in the picture.

10. The device according to claim 9, wherein said collector unit is one of a plurality of collector units coupled to said evaluation unit, and said evaluation unit determines each corresponding picture from the signals received by said collector units.

11. A method for detecting depth and color information of an object to be surveyed, which comprises:

a) projecting a predetermined wave pattern having first waves with at least one first wavelength in a spectral range outside visible light;

b) receiving waves at least partially reflected from an object, the waves including the first waves and second waves, the second waves having at least one second wavelength in the visible-light spectral range; and c) detecting depth and color information of the object as a function of the waves.

12. The method according to claim 11, wherein the first waves have a plurality of first wavelengths.

13. The method according to claim 11, wherein the second waves have a plurality of second wavelengths.

14. The method according to claim 11, which further comprises generating signals as a function of the waves, and detecting the depth and color information of the object as a function of the signals.

15. The method according to claim 11, which further comprises processing the first and second waves separately from each other.

16. The method according to claim 13, wherein the second waves have one second wavelength in the red-light spectral range, one second wavelength in the green-light spectral range and one second wavelength in the blue-light spectral range.

17. The method according to claim 11, wherein the first wavelength is in the infrared-radiation spectral range.

18. The method according to claim 11, which further comprises determining a picture as a function of the waves, and assigning at least one value for the depth information and at least one value for the color information to at least some pixels in the picture.

* * * * *